(12) United States Patent
Ghosh et al.

(10) Patent No.: US 9,699,807 B2
(45) Date of Patent: Jul. 4, 2017

(54) HIGH-EFFICIENCY WI-FI (HEW) STATION AND ACCESS POINT (AP) AND METHOD FOR RANDOM ACCESS CONTENTION

(71) Applicant: Intel IP Corporation, Santa Clara, CA (US)

(72) Inventors: Chittabrata Ghosh, Fremont, CA (US); Robert J. Stacey, Portland, OR (US); Shahrnaz Azizi, Cupertino, CA (US); Po-Kai Huang, West Lafayette, IN (US)

(73) Assignee: Intel IP Corporation, Santa Clara, CA (US)

( * ) Notice: Subject to any disclaimer, the term of this patent is extended or adjusted under 35 U.S.C. 154(b) by 27 days.

(21) Appl. No.: 14/671,174

(22) Filed: Mar. 27, 2015

(65) Prior Publication Data

US 2016/0143006 A1 May 19, 2016

Related U.S. Application Data

(60) Provisional application No. 62/081,630, filed on Nov. 19, 2014.

(51) Int. Cl.
*H04W 72/04* (2009.01)
*H04W 74/00* (2009.01)
(Continued)

(52) U.S. Cl.
CPC .......... *H04W 74/004* (2013.01); *H04W 48/12* (2013.01); *H04W 48/16* (2013.01); *H04W 72/0446* (2013.01); *H04W 84/12* (2013.01)

(58) Field of Classification Search
CPC ............. H04W 84/12; H04W 72/1289; H04W 72/0413; H04B 7/0452; H04L 5/0007
See application file for complete search history.

(56) References Cited

U.S. PATENT DOCUMENTS

2013/0107801 A1 5/2013 Zheng
2014/0098724 A1 4/2014 Park et al.
(Continued)

FOREIGN PATENT DOCUMENTS

WO WO-2013112009 A1 8/2013
WO WO-2014107031 A1 7/2014
WO WO-2016081126 A1 5/2016

OTHER PUBLICATIONS

"International Application Serial No. PCT/US2015/056334, International Search Report mailed Mar. 25, 2016", 3 pgs.
(Continued)

*Primary Examiner* — Luat Phung
(74) *Attorney, Agent, or Firm* — Schwegman Lundberg & Woessner, P.A.

(57) ABSTRACT

Embodiments of a high-efficiency Wi-Fi (HEW) station, access point (AP), and method for random access contention in a wireless network are generally described herein. In some embodiments, the HEW station may receive a beacon frame that indicates a number of trigger frames (TFs) included in a beacon interval. The beacon frame may be received from an HEW access point (AP) in channel resources that include multiple sub-channels. The HEW station may receive a random access TF that indicates a random access portion of the sub-channels that are allocated for random access contention during an uplink transmission period. The HEW station may select a candidate sub-channel from the channel resources. When the candidate sub-channel is included in the random access portion, the HEW station may transmit an association request (AR) frame on the candidate sub-channel during the uplink transmission period.

19 Claims, 9 Drawing Sheets

(51) Int. Cl.
*H04W 84/12* (2009.01)
*H04W 48/12* (2009.01)
*H04W 48/16* (2009.01)

(56) References Cited

U.S. PATENT DOCUMENTS

2014/0321349 A1   10/2014  Seok et al.
2016/0119927 A1*  4/2016  Hedayat ................ H04W 72/12
                                                                               370/329
2016/0128024 A1*  5/2016  Frederiks .............. H04W 72/04
                                                                               370/329

OTHER PUBLICATIONS

"International Application Serial No. PCT/US2015/056334, Written Opinion mailed Mar. 25, 2016", 6 pgs.

\* cited by examiner

HIGH-EFFICIENCY WI-FI (HEW) STATION AND ACCESS POINT (AP) AND METHOD FOR RANDOM ACCESS CONTENTION

PRIORITY CLAIM

This application claims priority under 35 USC 119(e) to U.S. Provisional Patent Application Ser. No. 62/081,630, filed Nov. 19, 2014 which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group (SG) (named DensiFi). Some embodiments relate to high-efficiency (HE) wireless or high-efficiency WLAN or Wi-Fi (HEW) communications. Some embodiments relate to multi-user (MU) multiple-input multiple-output (MIMO) communications and orthogonal frequency division multiple access (OFDMA) communication techniques. Some embodiments relate to random access contention techniques.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
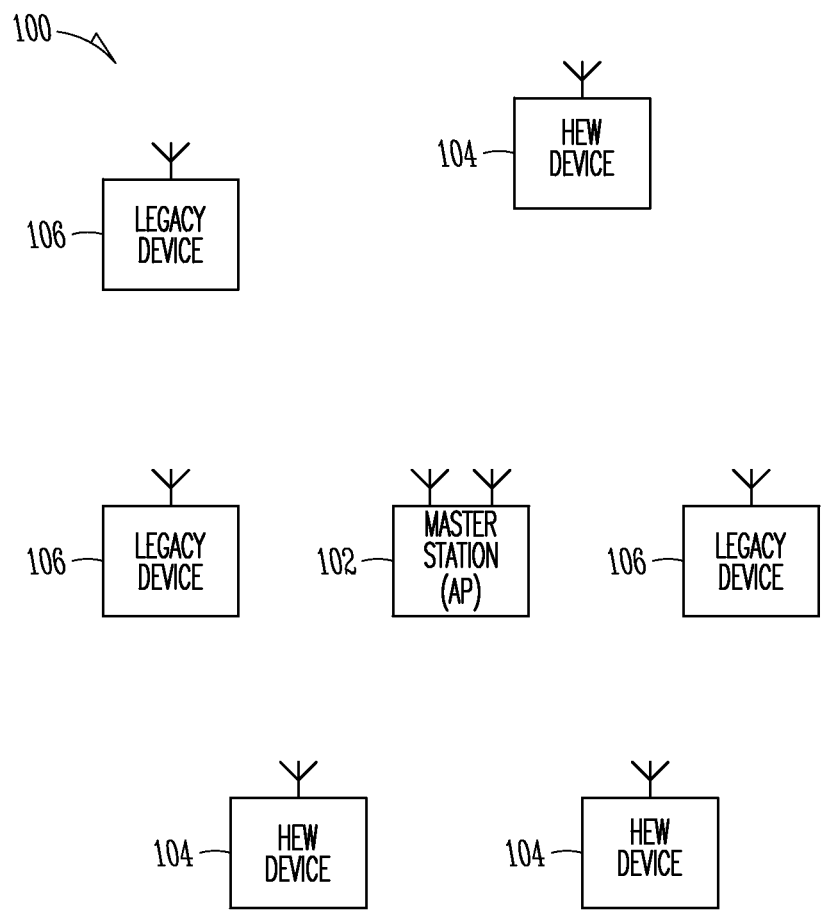
FIG. 1 illustrates a High Efficiency Wi-Fi (HEW) network in accordance with some embodiments.

FIG. 1 illustrates a High Efficiency (HE) Wi-Fi (HEW) network in accordance with some embodiments. HEW network 100 may include a master station (STA) 102, a plurality of HEW stations 104 (HEW devices), and a plurality of legacy stations 106 (legacy devices). The master station 102 may be arranged to communicate with the HEW stations 104 and the legacy stations 106 in accordance with one or more of the IEEE 802.11 standards. In accordance with some HEW embodiments, an access point may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, legacy stations 106 may refrain from communicating. In some embodiments, the master-sync transmission may be referred to as a control and schedule transmission.

In some embodiments, the HEW AP 102 may transmit a beacon frame that indicates a number of trigger frames (TFs) included in a beacon interval. The HEW station 104 may receive the beacon frame and may transmit an association request (AR) frame or other uplink frame on a selected candidate sub-channel when the candidate sub-channel is included in a random access portion of channel resources. These embodiments will be described in more detail below.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with legacy stations 106 in accordance with legacy IEEE 802.11 communication techniques. In some embodiments, the master station 102 may also be configurable communicate with the HEW stations 104 outside the HEW control period in accordance with legacy IEEE 802.11 communication techniques, although this is not a requirement.

In some embodiments, the HEW communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel of an HEW communication may be configured for transmitting a number of spatial streams.

In accordance with embodiments, a master station 102 and/or HEW stations 104 may generate an HEW packet in accordance with a short preamble format or a long preamble format. The HEW packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wi-Fi operation.

Figure 2:
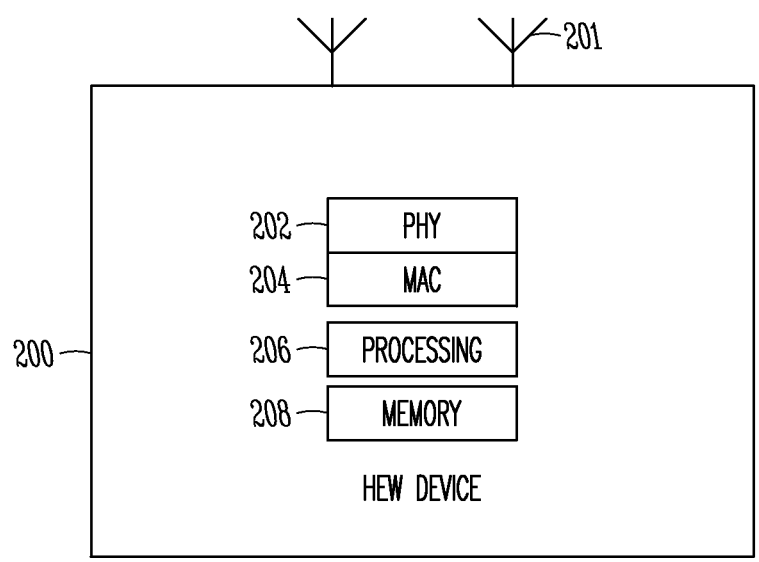
FIG. 2 illustrates an HEW device in accordance with some embodiments.

FIG. 2 illustrates an HEW device in accordance with some embodiments. HEW device 200 may be an HEW compliant device that may be arranged to communicate with one or more other HEW devices, such as HEW stations and/or a master station, as well as communicate with legacy devices. HEW device 200 may be suitable for operating as master station or an HEW station. In accordance with embodiments, HEW device 200 may include, among other things, physical layer (PHY) circuitry 202 and medium-access control layer circuitry (MAC) 204. PHY 202 and MAC 204 may be HEW compliant layers and may also be compliant with one or more legacy IEEE 802.11 standards. PHY 202 may be arranged to transmit HEW frames. HEW device 200 may also include other processing circuitry 206 and memory 208 configured to perform the various operations described herein.

In accordance with some embodiments, the MAC 204 may be arranged to contend for a wireless medium during a contention period to receive control of the medium for the HEW control period and configure an HEW frame. The PHY 202 may be arranged to transmit the HEW frame as discussed above. The PHY 202 may also be arranged to receive an HEW frame from HEW stations. MAC 204 may also be arranged to perform transmitting and receiving operations through the PHY 202. The PHY 202 may include circuitry for modulation/demodulation, upconversion and/or downconversion, filtering, amplification, etc. In some embodiments, the processing circuitry 206 may include one or more processors. In some embodiments, two or more antennas may be coupled to the physical layer circuitry arranged for sending and receiving signals including transmission of the HEW frame. The memory 208 may store information for configuring the processing circuitry 206 to perform operations for configuring and transmitting HEW frames and performing the various operations described herein.

In some embodiments, the HEW device 200 may be configured to communicate using OFDM communication signals over a multicarrier communication channel. In some embodiments, HEW device 200 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the invention is not limited in this respect as they may also be suitable to transmit and/or receive communications in accordance with other techniques and standards. In some other embodiments, HEW device 200 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW device 200 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, HEW device 200 may include one or more of a keyboard, a display, a non-volatile memory port, multiple antennas, a graphics processor, an application processor, speakers, and other mobile device elements. The display may be an LCD screen including a touch screen.

The antennas 201 of HEW device 200 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result between each of antennas and the antennas of a transmitting station.

Although HEW device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW device 200 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Embodiments disclosed herein provide two preamble formats for High Efficiency (HE) Wireless LAN standards specification that is under development in the IEEE Task Group 11ax (TGax).

In accordance with embodiments, the HEW station 104 may receive a beacon frame that indicates a number of trigger frames (TFs) included in a beacon interval. The beacon frame may be received from the HEW AP 102 in channel resources that include multiple sub-channels. The HEW station 104 may receive a random access TF that indicates a random access portion of the sub-channels that are allocated for random access contention during an uplink transmission period. The HEW station 104 may select a candidate sub-channel from the channel resources. When the candidate sub-channel is included in the random access portion, the HEW station 104 may transmit an association request (AR) frame or other uplink frame on the candidate sub-channel during the uplink transmission period. These embodiments will be described in more detail below.

In some embodiments, the channel resources may be used for downlink transmission by the HEW AP 102 and for uplink transmissions by the HEW stations 104. That is, a time-division duplex (TDD) format may be used. In some cases, the channel resources may include multiple channels, such as the 20 MHz channels previously described. The channels may include multiple sub-channels or may be divided into multiple sub-channels for the uplink transmissions to accommodate multiple access for multiple HEW stations 104. The downlink transmissions may or may not utilize the same format.

In some embodiments, the downlink sub-channels may comprise a predetermined bandwidth. As a non-limiting example, the sub-channels may each span 2.03125 MHz, the channel may span 20 MHz, and the channel may include eight or nine sub-channels. Although reference may be made to a sub-channel of 2.03125 MHz for illustrative purposes, embodiments are not limited to this example value, and any suitable frequency span for the sub-channels may be used. In some embodiments, the frequency span for the sub-channel may be based on a value included in an 802.11 standard (such as 802.11ax), a 3GPP standard or other standard.

In some embodiments, the sub-channels may comprise multiple sub-carriers. Although not limited as such, the sub-carriers may be used for transmission and/or reception of OFDM or OFDMA signals. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases. As an example, for a 78.125 kHz sub-carrier spacing, a sub-channel may comprise 26 contiguous sub-carriers or a bandwidth of 2.03125 MHz.

Figure 3:
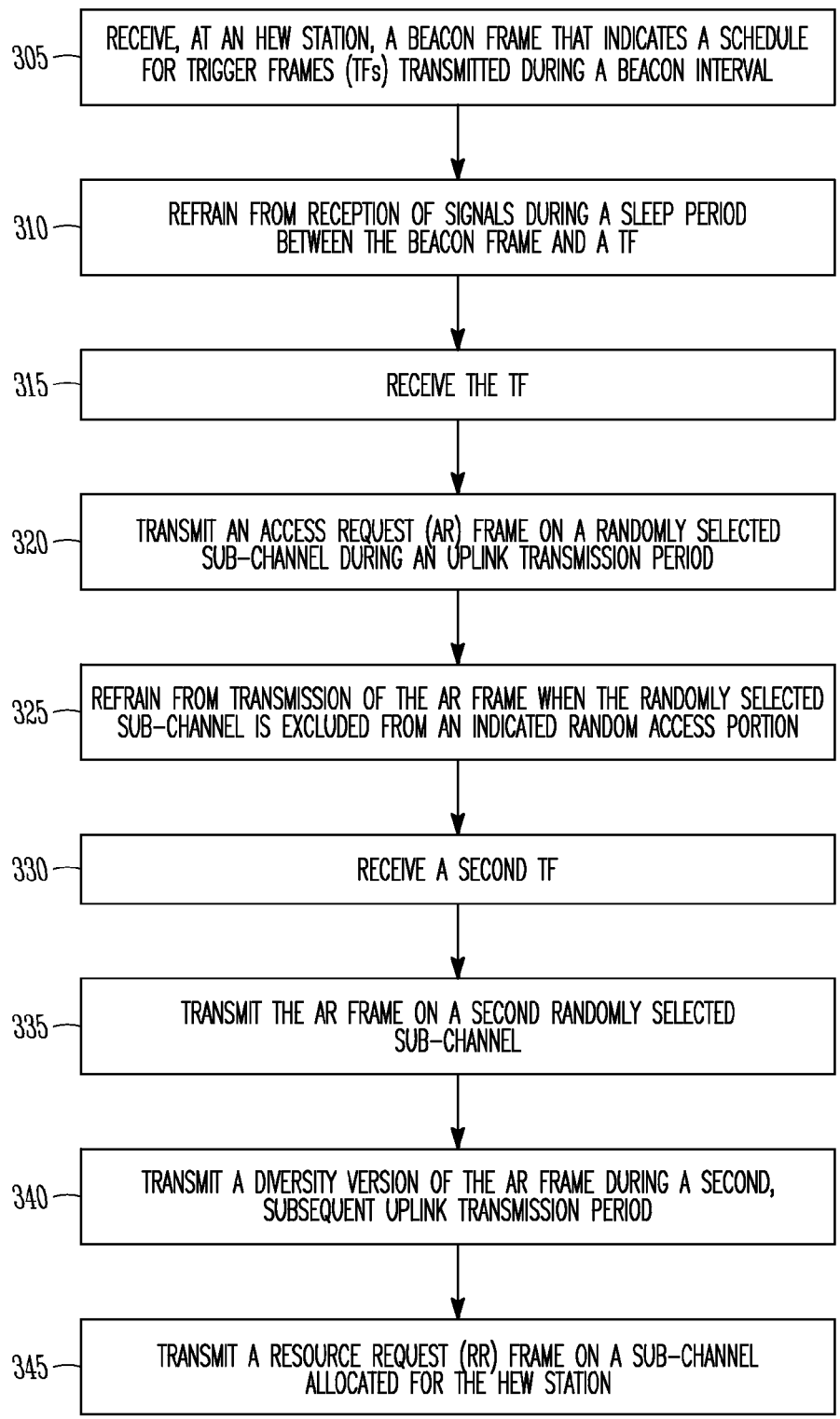
FIG. 3 illustrates the operation of a method of random access contention in accordance with some embodiments.

FIG. 3 illustrates the operation of a method of random access contention in accordance with some embodiments. It is important to note that embodiments of the method 300 may include additional or even fewer operations or processes in comparison to what is illustrated in FIG. 3. In addition, embodiments of the method 300 are not necessarily limited to the chronological order that is shown in FIG. 3. In describing the method 300, reference may be made to FIGS. 1-2 and 4-9, although it is understood that the method 300 may be practiced with any other suitable systems, interfaces and components.

In addition, while the method 300 and other methods described herein may refer to HEW stations 104 and HEW APs 102 operating in accordance with 802.11 or other standards, embodiments of those methods are not limited to just those HEW stations 104 or HEW APs 102 and may also be practiced on other mobile devices, such as a user station (STA), an Evolved Node-B (eNB) or User Equipment (UE). The method 300 and other methods described herein may also be practiced by wireless devices configured to operate in other suitable types of wireless communication systems, including systems configured to operate according to various Third Generation Partnership Project (3GPP) Long Term Evolution (LTE) standards.

At operation 305 of the method 300, the HEW station 104 may receive a beacon frame. In some embodiments, the beacon frame may indicate a schedule for trigger frames (TFs) transmitted during a beacon interval. For instance, a number of TFs included in the beacon interval may be included in the beacon frame. In some embodiments, the beacon frame may include a TF timing that may indicate a starting time or other time associated with one or more of the scheduled TFs. In addition, other events may be indicated by the beacon frame, such as transmission of ACK messages and periods of time in which HEW stations 104 may transmit. The beacon frame may further include a beacon interval type that indicates whether random access is supported by the HEW AP during the beacon interval. In addition, random access or scheduled access may be indicated in the beacon frame for one or more of the TFs.

In some embodiments, the beacon frame may be received from the HEW AP 102 in channel resources that include multiple sub-channels. As previously described, the sub-channels may comprise a predetermined bandwidth and may further comprise multiple sub-carriers. As an example, the channel resources may include four channels of 20 MHz and each channel may include nine sub-channels of 2.03125 MHz. Accordingly, the channel resources may include 36 sub-channels, which may be numbered in the range {0, 1, . . . , 35}. This example is not limiting, however, as other suitable values may be used for the bandwidth of the channel resources, channels, and sub-channels and for the number of channels and sub-channels.

At operation 310, the HEW station 104 may refrain from reception of signals during a sleep period between the reception of the beacon frame and the reception of a TF, which may be the earliest scheduled TF of the beacon interval. Though not limited as such, the HEW station 104 may also refrain from transmission of signals and may reduce its functionality and power usage during the sleep period, in some cases. In some embodiments, the sleep period may be based at least partly on the TF timing indicated in the beacon frame. For instance, the HEW station 104 may determine when the earliest TF of the beacon interval is scheduled, and may decide to enter the sleep mode for a portion of the time period between the beacon frame and the earliest TF.

At operation 315, the HEW station 104 may receive a TF that indicates a random access portion of the sub-channels that are allocated for random access contention during an uplink transmission period. The TF may be a random access TF, a scheduled access TF, or another type of TF. As an example, the TF may also include allocations of dedicated sub-channels for scheduled transmissions by one or more associated HEW stations 104. The TF may be received from the HEW AP 102 according to the TF timing indicated in the beacon frame, in some cases.

In some embodiments, the random access portion may be indicated by a random access Association Identifier (AID). That is, a particular AID may be reserved for communication of the random access portion to the HEW stations 104. For instance, a value of 0 for the AID (AID-0) may be reserved for this purpose. Information may be included in the beacon frame along with AID-0, and the HEW stations 104 may use the information to identify which sub-channels are included in the random access portion. It should be noted that the value of 0 is a non-limiting example, and other suitable values may be used.

The HEW station 104 may determine a candidate sub-channel from the channel resources, for potential use in an uplink transmission. In some embodiments, the determination may include a random selection of the candidate sub-channel from the channel resources. The random selection may include uniform selection in which each of the unused sub-channels is selected with equal probability. For instance, when 36 sub-channels are included in the channel resources, each may be selected with a probability of 1/36.

At operation 320, when the candidate sub-channel is included in the random access portion indicated in the beacon frame, the HEW station 104 may transmit an association request (AR) frame or other uplink frame on the candidate sub-channel during the uplink transmission period. That is, a comparison between the candidate sub-channel and the allocated group of random access sub-channels may be performed. It should be noted that the other uplink frames may include a probe request (PR) frame or other management, control or action frame.

At operation 325, the HEW station 104 may refrain from transmission of the AR frame or other uplink frame when the candidate sub-channel is excluded from the random access portion. In this case, the HEW station 104 may wait until a second, subsequent uplink transmission period or other period to attempt random access again. At operation 330, a second TF may be received, which may indicate a second random access portion or a second group of sub-channels allocated for random access during a second uplink transmission period. The sub-channels may or may not be the same as the group of sub-channels indicated in the first TF for the first uplink transmission period.

The HEW station 104 may select a second candidate sub-channel from the channel resources using previously described or other techniques. The second candidate sub-channel may be compared to the sub-channels in the second random access portion to determine whether the HEW station 104 may transmit the AR frame or other uplink frame in the second uplink transmission period. When the second candidate sub-channel is included in the second random access portion, the HEW station 104 may transmit the AR frame or other uplink frame on the second candidate sub-channel during the second uplink transmission period at operation 335.

It should be noted that additional attempts for subsequent random access periods may be made by the HEW station 104 when the second candidate sub-channel is not part of the second random access portion. Embodiments are not limited to just the first and second uplink transmission periods, and any suitable number may be used.

In addition, a low power HEW station 104 may also perform random access using similar techniques. At operation 340, the low power HEW station 104 may transmit a diversity version of the AR frame or other uplink frame during the second, subsequent uplink transmission period. As an example, the low power HEW station 104 may transmit the AR frame and a diversity version of the AR frame during the first and second uplink transmission periods described, and may use similar techniques for selection of the candidate sub-channels and comparisons with the allocated random access portions.

Operations such as 320-340 may be part of a random sub-channel back-off process, and may be performed when the HEW station 104 operates in an unassociated state of connectivity to the HEW AP 102. In addition, such operations may be performed when the beacon interval type indicates support for random access during the beacon interval.

The HEW station 104 may also operate in an associated state of connectivity to the HEW AP 102. This state may be reached, in some cases, after a successful random access by the HEW station 104. The HEW station 104 may receive one or more TFs for random access and/or scheduled access, which may include one or more sub-channels that are allocated for dedicated transmission by the HEW station 104 during the uplink transmission period. Accordingly, a resource request (RR) frame may be transmitted by the HEW station 104 at operation 345. Embodiments are not limited to RR frames, however, as other uplink frames may be used in some cases, including other management, control or action frames.

In some embodiments, the TFs may include TF counters that indicate an index of the TF with respect to the number of TFs included in the beacon interval. The TF counter may be set to the number of TFs in the first (earliest) TF, and each subsequent TF may decrement the counter by one. That is, the TF counter may provide a "count-down" of the TF frames in the beacon interval.

The beacon type indicator may indicate support for random access during the beacon interval. In addition, a "beacon phase" may also be indicated, and the HEW station 104 may use this information to determine if it can communicate and/or perform random access during the beacon interval. As an example, an unassociated HEW station 104 may attempt to perform random access during an unassociated random access phase (U-RAP). An associated HEW station 104 may attempt to communicate during a scheduled access phase (SAP). A low power HEW station 104 may attempt to communicate during a low-power random access phase (PS-RAP). As an example, values of 00, 01, 10, 11 for the beacon interval type indicator may correspond to U-RAP, PS-RAP, SAP with short packets, and SAP with long packets, respectively.

The beacon type indicator or other parameter included in the beacon frame may indicate support for a mixture of one or more beacon phases during the beacon interval, an example of which will be presented below. Accordingly, multiple TFs may be received during the beacon interval, and the TFs received may include one or more random access TFs, scheduled access TFs, or mixed TFs. Although not limited as such, the random access TFs may exclude information for associated HEW stations 104 and the scheduled access TFs may exclude information for unassociated HEW stations 104. The mixed TFs may include information for both associated and unassociated HEW stations 104.

During a beacon interval that supports such a mixture of beacon phases, the TF timing included in the beacon frame may indicate timing for one, some, or all of these TFs. Accordingly, the HEW station 104 may enter a sleep mode based on the indicated timing for the appropriate TF. For instance, an unassociated HEW station 104 may enter the sleep mode until a TF intended for random access is scheduled.

In some embodiments, the transmission of uplink frames during the PS-RAP phase may be restricted to unassociated low power HEW stations 104. The HEW stations 104 that are not low power HEW stations 104 may refrain from performing random access during the PS-RAP phase. As such, a separate random access phase may be dedicated to the low power HEW stations 104. As an example, uplink frames (or packets) transmitted in the PS-RAP phase may be shorter than similar uplink frames transmitted as part of the U-RAP phase. As another example, fragments of data packets may be transmitted by the HEW stations 104 in the PS-RAP phase. As another example, multiple diversity versions of a frame or packet may be transmitted by the HEW stations 104 in the PS-RAP phase.

Several example scenarios and configurations will be presented below for illustration of concepts. It should be noted that the examples are not limiting. Embodiments may include some, none, or all of the features shown in one or more of the examples, and some embodiments may also include additional features not shown in the examples.

Figure 4:
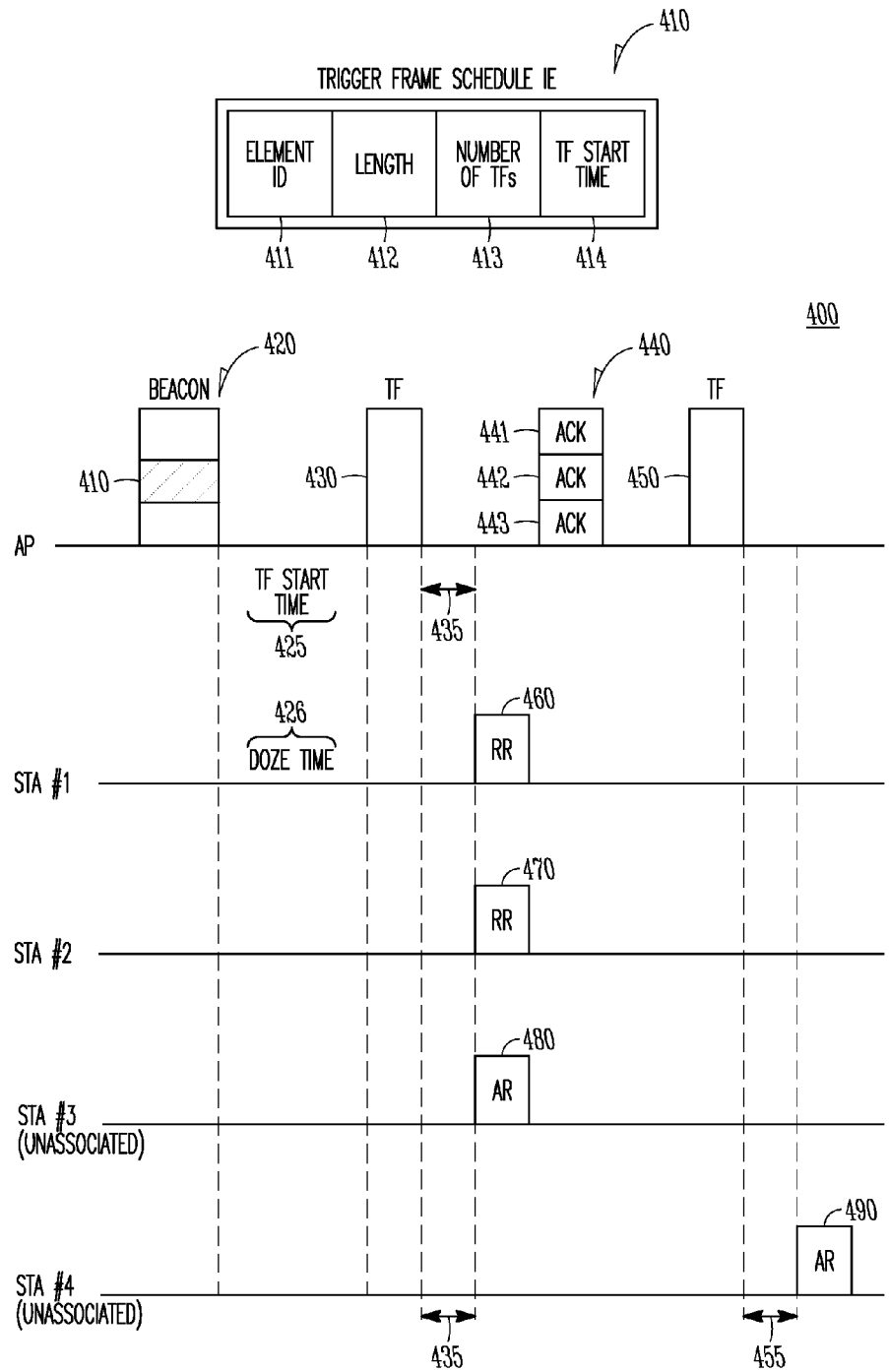
FIG. 4 illustrates an example of a random access scenario that includes multiple HEW stations in accordance with some embodiments.

FIG. 4 illustrates an example of a random access scenario that includes multiple HEW stations in accordance with some embodiments. It should be noted that embodiments are not limited to the number of HEW stations 104, trigger frames (TFs) or other frames shown in FIG. 4. Embodiments are also not limited to the example frame types shown, as other types of uplink frames and/or downlink frames may also be used in some cases. The beacon frame 420 may be transmitted by the HEW AP 102 in order to provide HEW stations 104 with information about trigger frames (TFs) scheduled for transmission by the HEW AP 102 during a beacon interval. The beacon interval may also be referred to as a beacon window or beacon period. In some embodiments, the beacon 420 may include a Trigger Frame Schedule Information Element (IE) 410, and may also include other IEs, parameters, data, control information or other information not shown in FIG. 4.

The Trigger Frame Schedule IE 410 is shown in more detail at the top of FIG. 4, and may include any or all of an element ID 411, a length 412, a number of TFs 413 included in the beacon interval, and a TF start time 414. It should be noted that the Trigger Frame Schedule IE 410 may also include other parameters, data, control information or other information not shown in FIG. 4. In addition, the Trigger Frame Schedule IE 410 is also not limited to the order or presentation of the parameters 411-414 as shown in FIG. 4.

The first TF 430 may be transmitted for reception at the HEW stations 104. As shown in FIG. 4, a duration of time between the transmissions of the beacon 420 and the first TF 430 may be the TF start time 425. The duration may also be considered a "doze time" 426 from the perspective of the HEW stations 104. Accordingly, the HEW stations 104 may enter a sleep mode or a mode of reduced operation after decoding the beacon 420 and before the reception of the first TF 430. As previously described, the TF 430 may indicate sub-channel allocations for one or more associated stations, such as HEW stations #1 and #2 in this example. The TF 430 may also indicate a group of available random access sub-channels allocated for random access by unassociated stations, such as HEW stations #3 and #4 in this example.

When a short inter-frame space (SIFS) 435 has elapsed since the reception of the TF 430, the HEW stations 104 may transmit an association request (AR) or a resource request (RR). In the example of FIG. 4, HEW stations #1 and #2 are both associated with the HEW AP 102, and therefore they transmit the RRs 460, 470. The unassociated HEW station #3 transmits the AR 480, while the unassociated HEW station #4 does not transmit an AR. As an example, HEW station #4 may have randomly selected an AR transmission sub-channel that is not part of the group of available random access sub-channels specified in the TF 430. Accordingly, the HEW station #4 may be restricted or prohibited from AR transmission during the time period after the SIFS 435.

An ACK message 440 may be transmitted by the HEW AP 102, and may provide feedback (e.g. decoding success or failure) related to the reception of the RRs 460, 470, the AR 480, and perhaps other frames. The ACK 440 may include any number of individual ACKs 441-443 in some cases.

The second TF 450 may be transmitted for reception at the HEW stations 104. As an example, the transmission of the second TF 450 may occur after a predetermined spacing has elapsed since the transmission of the first TF 430. As another example, the transmission of the second TF 450 may occur at a time indicated in the beacon 420 or in the first TF 430. These examples are not limiting, however, and any suitable technique for determination of the transmission time for the second TF 450 may be used.

As previously described, the TF 450 may indicate sub-channel allocations for one or more associated stations. The TF 450 may also indicate a group of available random access sub-channels allocated for random access, and the group may or may not be the same as the group specified in the TF 430. In this case, HEW station #4 may have randomly selected an AR transmission sub-channel that is part of the group of available random access sub-channels specified in the TF 450. The HEW station #4 may therefore transmit the AR 490 when the SIFS 455 has elapsed after the reception of the second TF 450.

In addition, the TFs 430, 450 may include a TF counter that indicates an index of the random access TF with respect to the number of TFs included in the beacon interval. For instance, the TF counter may provide a "count-down" of the TF frames in the beacon interval. The TF counter value included in the first TF 430 may be initialized to the number of TFs in the beacon interval. The TF counter may be decremented by one for the second TF 450, and may be further decremented by one during each subsequent TF in the beacon interval. As an example, the TF counter may enable unassociated HEW stations 104 to set a network allocation vector (NAV) according to the end of the last scheduled TF in the beacon interval.

Figure 5:
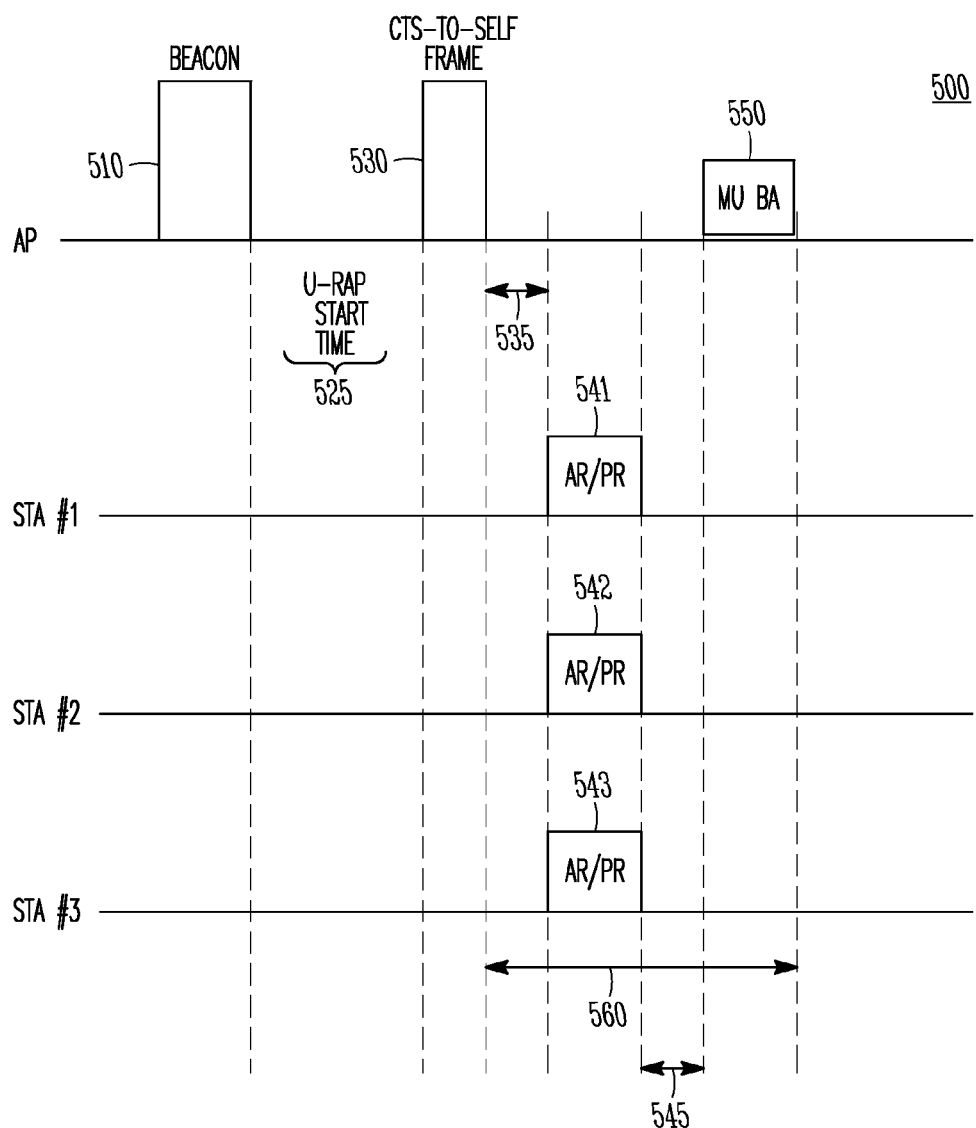
FIG. 5 illustrates another example of a random access scenario that includes multiple HEW stations in accordance with some embodiments.

FIG. 5 illustrates an example of another random access scenario that includes multiple HEW stations in accordance with some embodiments. In the example scenario 500, a beacon phase (or beacon interval type) for the beacon interval is set to the value of uplink random access phase (U-RAP). As a non-limiting example, a value of 00 for the beacon interval type may indicate U-RAP operation for the beacon interval. For the U-RAP operation, uplink frames may be transmitted by unassociated HEW stations 104. In some embodiments, the transmission of uplink frames may be restricted to unassociated HEW stations 104, and related TFs may exclude allocations for associated HEW stations 104. In some embodiments, a range of resource units (RUs) or sub-channels may be restricted by the HEW AP 102 for the U-RAP operation. It should be noted that embodiments are not limited to the number of HEW stations 104, trigger frames (TFs) or other frames shown in FIG. 5.

The beacon frame 510 may be transmitted by the HEW AP 102 in order to provide HEW stations 104 with information about trigger frames (TFs) scheduled for transmission by the HEW AP 102 during a beacon interval. The beacon interval may also be referred to as a beacon window or beacon period. In some embodiments, the beacon 510 may include a Trigger Frame Schedule Information Element (IE) 410, and may also include other IEs, parameters, data, control information or other information about the beacon interval.

The CTS-to-self frame 530 may be transmitted for reception at the HEW stations 104. In some cases, a TF may be transmitted instead of the CTS-to-self frame 530. As shown in FIG. 5, a duration of time between the transmissions of the beacon 510 and the CTS-to-self frame 530 may be the U-RAP start time 525. In some embodiments, the U-RAP start time 525 may be indicated in the beacon 510. The CTS-to-self frame 530 may indicate a group of available random access sub-channels allocated for random access by unassociated stations, such as HEW stations #1, #2, and #3.

When a short inter-frame space (SIFS) 535 has elapsed since the reception of the CTS-to-self frame 530, the HEW stations 104 may transmit a management frame, such as an association request (AR) or a probe request (PR), as indicated by 541-543. An ACK message 550 (shown as a multi-user block ACK (MU-BA) in FIG. 5) may be transmitted by the HEW AP 102, and may provide feedback (e.g. decoding success or failure) related to the reception of the AR/PRs 541-543. Although not limited as such, the ACK message 550 may be transmitted after the SIFS 545 has elapsed since the reception of the AR/PRs 541-543. As an example, the U-RAP interval 560 may reflect a time duration between the CTS-to-self frame 530 and the MU-BA 550. This example is not limiting, however, as the U-RAP interval may reflect other time durations related to elapsed times between other frames, in some cases.

Figure 6:
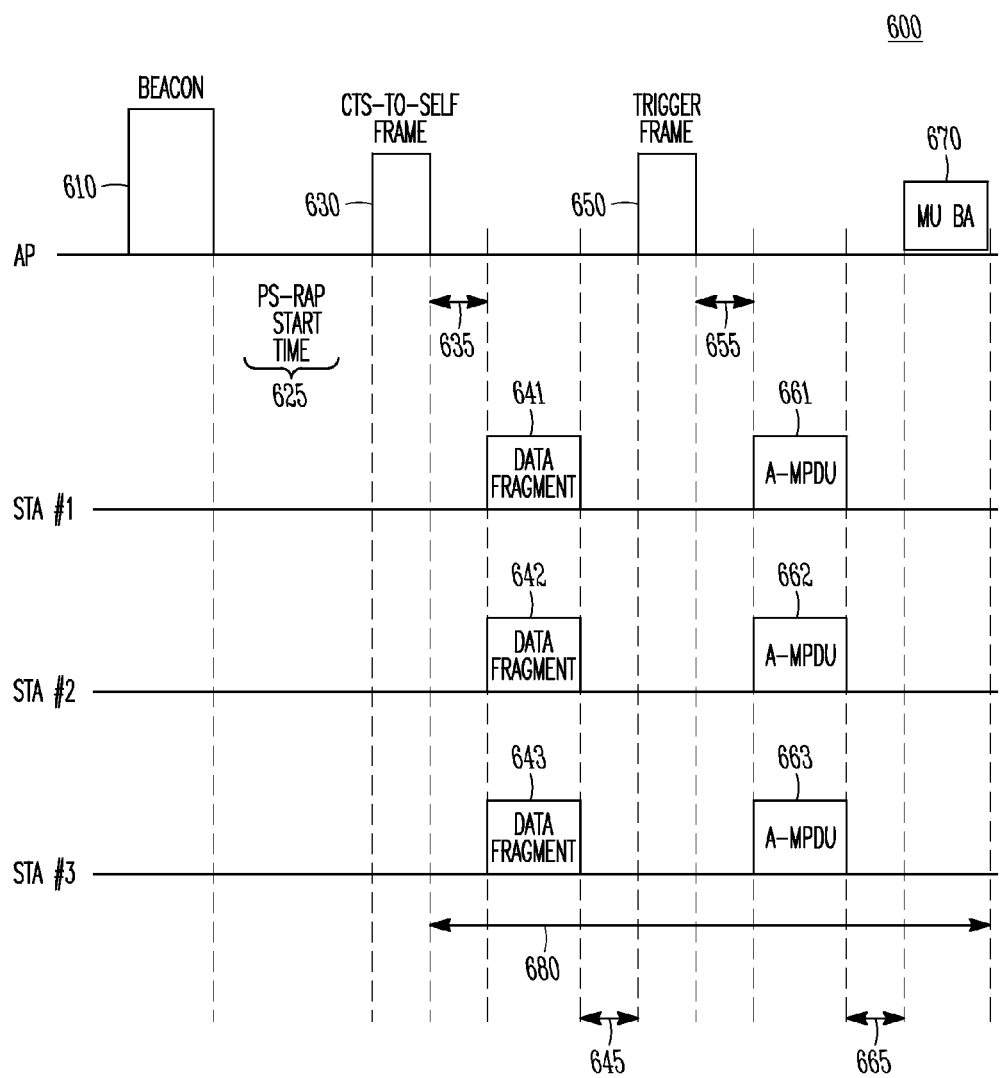
FIG. 6 illustrates another example of a random access scenario that includes multiple HEW stations in accordance with some embodiments.

FIG. 6 illustrates an example of another random access scenario that includes multiple HEW stations in accordance with some embodiments. In the example scenario 600, a beacon phase (or beacon interval type) for the beacon interval is set to the value of low power random access phase (PS-RAP). As a non-limiting example, a value of 01 for the beacon interval type may indicate PS-RAP operation for the beacon interval. As previously described, for the PS-RAP operation, uplink frames may be transmitted by low power HEW stations 104. It should be noted that embodiments are not limited to the number of HEW stations 104, trigger frames (TFs) or other frames shown in FIG. 6.

As previously described, the beacon frame 610 may provide HEW stations 104 with information about trigger frames (TFs) scheduled for transmission by the HEW AP 102 during a beacon interval. The CTS-to-self frame 630 may be transmitted for reception at the HEW stations 104, and a TF may be transmitted instead of the CTS-to-self frame 630 in some cases. A duration of time between the transmissions of the beacon 610 and the CTS-to-self frame 630 may be the PS-RAP start time 625, which may be indicated in the beacon 610 in some cases. The CTS-to-self frame 630 may indicate a group of available random access sub-channels allocated for random access by unassociated low power stations, resource allocations for one or more associated low power HEW stations 104, or a combination thereof.

When an SIFS 635 has elapsed since the reception of the CTS-to-self frame 630, the HEW stations 104 may transmit a data fragment 641-643 or other frame or packet. A TF 650 may be transmitted after the SIFS 645 has elapsed since the transmission of the data fragments 641-643. Each HEW station 104 may transmit an Aggregated MAC PDU (A-MPDU) 661-663 or other fragment, frame, or packet after the SIFS 655 has elapsed. The HEW AP 102 may transmit the MU-BA 670, which may provide feedback (e.g. decoding success or failure) related to the reception of the data fragments 641-643 and/or the A-MPDUs 661-663. Although not limited as such, the MU-BA 670 may be transmitted after the SIFS 665 has elapsed since the reception of the A-MPDUs 661-663. As an example, the PS-RAP interval 680 may reflect a time duration between the CTS-to-self frame 630 and the MU-BA 670. This example is not limiting, however, as the PS-RAP interval may reflect other time durations related to elapsed times between other frames, in some cases.

Figure 7:
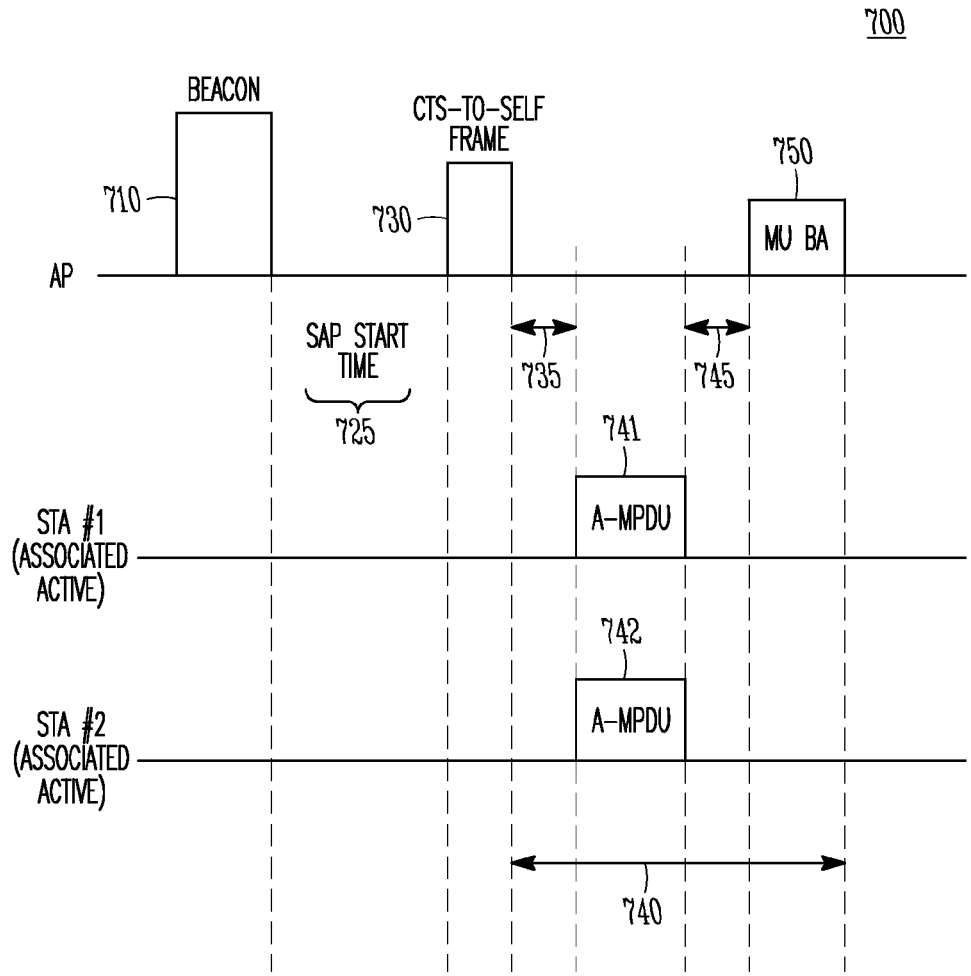
FIG. 7 illustrates another example of a random access scenario that includes multiple HEW stations in accordance with some embodiments.

FIG. 7 illustrates an example of another random access scenario that includes multiple HEW stations in accordance with some embodiments. In the example scenario 700, a beacon phase (or beacon interval type) for the beacon interval is set to the value of scheduled access phase (SAP). As a non-limiting example, a value of 10 for the beacon interval type may indicate SAP operation with short packets while a value of 11 for the beacon interval type may indicate SAP operation with long packets. As previously described, for the SAP operation, uplink frames may be transmitted by each HEW station 104 on one or more sub-channels or resources dedicated to the HEW station 104. It should be noted that embodiments are not limited to the number of HEW stations 104, trigger frames (TFs) or other frames shown in FIG. 7.

As previously described, the beacon frame 710 may provide HEW stations 104 with information about trigger frames (TFs) scheduled for transmission by the HEW AP 102 during a beacon interval. The CTS-to-self frame 730 may be transmitted for reception at the HEW stations 104, and a TF may be transmitted instead of the CTS-to-self frame 730 in some cases. A duration of time between the transmissions of the beacon 710 and the CTS-to-self frame 730 may be the SAP start time 725, which may be indicated in the beacon 710 in some cases. The CTS-to-self frame 730 may indicate resource allocations for associated HEW stations 104, such as HEW stations #1 and #2.

When an SIFS 735 has elapsed since the reception of the CTS-to-self frame 730, the HEW stations 104 may transmit an A-MPDU 741, 742 or other frame or packet on the allocated sub-channels. The HEW AP 102 may transmit the MU-BA 750, which may provide feedback (e.g. decoding success or failure) related to the reception of the A-MPDUs 741, 742. Although not limited as such, the MU-BA 750 may be transmitted after the SIFS 745 has elapsed since the reception of the A-MPDUs 741, 742. As an example, the SAP interval 740 may reflect a time duration between the CTS-to-self frame 730 and the MU-BA 750. This example is not limiting, however, as the SAP interval may reflect other time durations related to elapsed times between other frames, in some cases.

Figure 8:
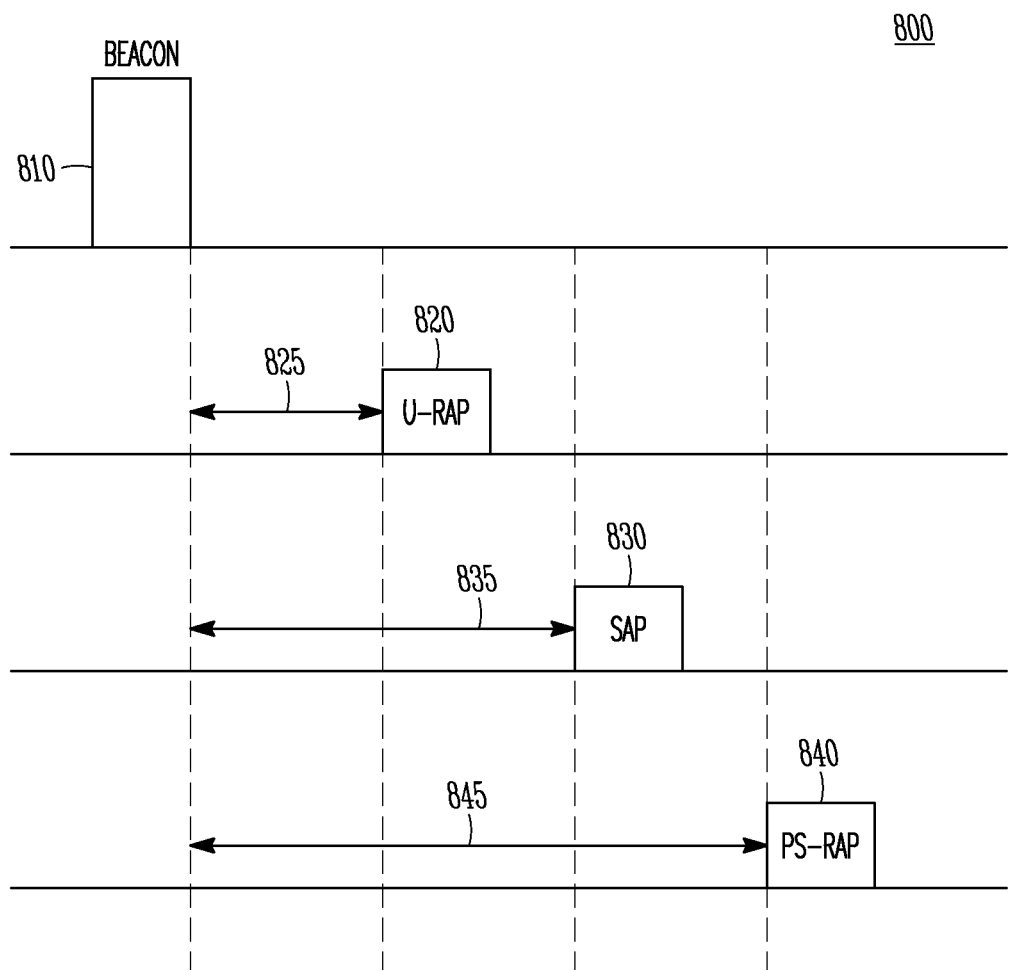
FIG. 8 illustrates an example of a random access scenario that includes multiple random access phases in accordance with some embodiments.

FIG. 8 illustrates an example of another random access scenario that includes multiple random access phases in accordance with some embodiments. In the example scenario 800, a beacon interval supports a mixture of beacon phases that includes the U-RAP 820, the SAP 830, and the PS-RAP 840. It should be noted that embodiments are not limited to the order of the phases shown in FIG. 8 or to the number of phases shown.

The beacon frame 810 may be transmitted by the HEW AP 102, and may indicate or include timing for each of the phases 820, 830, 840. The time durations 825, 835, 845 may be related to the U-RAP interval, SAP interval, and PS-RAP interval previously described, though not limited as such. Various HEW stations 104 may select to communicate with the HEW AP 102 during an appropriate phase of the beacon interval. An unassociated HEW station 104 may attempt to communicate during the U-RAP phase 820. An associated HEW station 104 may attempt to communicate during the SAP phase 830. A low power HEW station 104 may attempt to communicate during the PS-RAP phase 840. As an example, an associated HEW station 104 communicating during the SAP phase 830 may enter a sleep mode between the time of the beacon transmission and a starting time or other time associated with the SAP phase 830. Embodiments may include techniques previously described regarding the different phases and/or the scenarios 400, 500, 600, and 700 shown in FIGS. 4-7, but are not limited as such.

Figure 9:
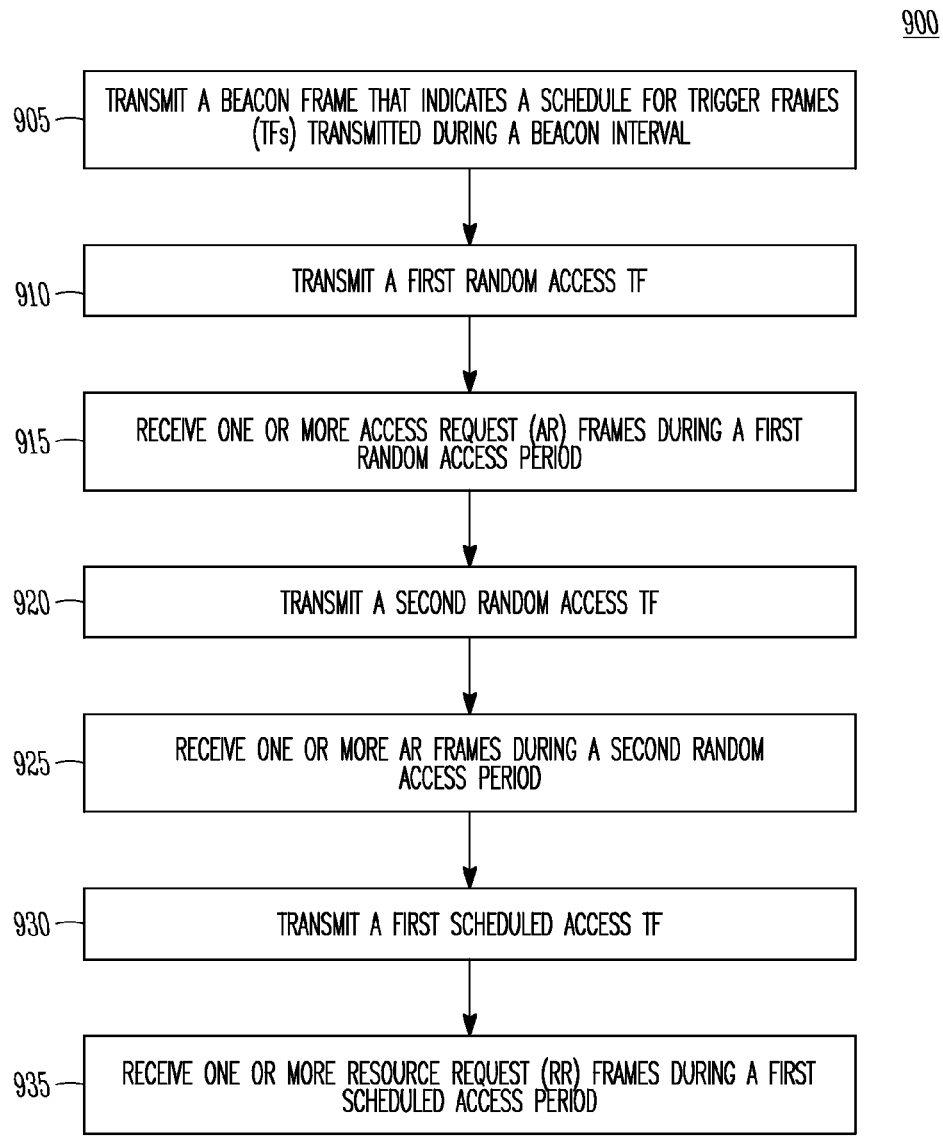
FIG. 9 illustrates the operation of another method of random access contention in accordance with some embodiments.

FIG. 9 illustrates the operation of another method of random access contention in accordance with some embodiments. As mentioned previously regarding the method 300, embodiments of the method 900 may include additional or even fewer operations or processes in comparison to what is illustrated in FIG. 9 and embodiments of the method 900 are not necessarily limited to the chronological order that is shown in FIG. 9. In describing the method 900, reference may be made to FIGS. 1-8, although it is understood that the method 900 may be practiced with any other suitable systems, interfaces and components. In addition, embodiments of the method 600 may refer to eNBs 104, UEs 102, APs, STAs or other wireless or mobile devices.

It should be noted that the method 900 may be practiced at an HEW AP 102, and may include exchanging of signals or messages with an HEW station 104. Similarly, the method 300 may be practiced at the HEW station 104, and may include exchanging of signals or messages with the HEW AP 102. In some cases, operations and techniques described as part of the method 300 may be relevant to the method 900. In addition, embodiments may include operations performed at the HEW AP 102 that are reciprocal or similar to other operations described herein performed at the HEW station 104. For instance, an operation of the method 900 may include transmission of a frame by the AP 102 while an operation of the method 300 may include reception of the same frame or similar frame by the HEW station 104.

In addition, previous discussion of various techniques and concepts may be applicable to the method 900 in some cases, including the beacon frame, beacon interval, beacon phase, and trigger frame (TF). Other concepts previously described, such as the access request (AR), probe request (PR), resource request (RR), channel resources, sub-channels, and sub-carriers may also be applicable to the method 900. In addition, the example scenarios shown in FIGS. 4-8 may also be applicable, in some cases.

At operation 905, the HEW AP 102 may transmit a beacon frame that indicates a schedule of events for a beacon interval. The events may include transmission of TFs by the HEW AP 102, reception of uplink frames from one or more HEW stations 104, transmission of other frames, and/or reception of other frames. The beacon frame may include additional information and parameters, as previously described.

At operation 910, a first random TF may be transmitted, and may indicate a first random access portion of channel resources allocated for random access by the HEW stations 104 during a first random access period. One or more AR frames or other uplink frames may be received from the HEW stations 104 in the first random access portion during the first random access period at operation 915. The received uplink frames may include one or more association request (AR) frames, probe request (PR) frames or other uplink frames. For instance, the uplink frames may be or may include management, control or action frames.

At operation 920, a second random access TF that indicates a second random access portion of the channel resources for a second random access period may be transmitted. The second channel resources may be based at least partly on the received uplink frames. For instance, the number of AR frames or other uplink frames successfully decoded during the first random access period may influence the HEW AP 102 to allocate more dedicated sub-channels and fewer random access sub-channels for the second random access period. At operation 925, one or more AR frames or other uplink frames may be received from the HEW stations 104 in the second random access portion during the second random access period.

At operation 930, a first scheduled access TF may be transmitted and may indicate a dedicated access portion of the channel resources allocated to a first HEW station 104 during a first scheduled access period. At operation 935, one or more RR frames or other frames may be received from the first HEW station 104 in the dedicated access portion during the first scheduled access period. Embodiments are not limited to just the first HEW station for the scheduled access TF.

An example of a high-efficiency Wi-Fi (HEW) station is disclosed herein. The HEW station may comprise hardware processing circuitry configured to receive a beacon frame that indicates a trigger frame (TF) timing for a beacon interval. The beacon frame may be received from an HEW access point (AP) in channel resources that include multiple sub-channels. The hardware processing circuitry may be further configured to receive a random access TF that indicates a random access portion of the sub-channels that are allocated for random access contention during an uplink transmission period. The hardware processing circuitry may be further configured to determine a candidate sub-channel from the channel resources. The hardware processing circuitry may be further configured to, when the candidate sub-channel is included in the random access portion, transmit an uplink frame on the candidate sub-channel during the uplink transmission period.

In some examples, the beacon frame may further indicate a number of TFs included in the beacon interval. The random access TF may be received from the HEW AP according to the indicated TF timing. In some examples, the random access portion may be indicated by a random access Association Identifier (AID). In some examples, the uplink frame may include an association request (AR) frame or a probe request (PR) frame. In some examples, the candidate sub-channel may be selected randomly from the channel resources. In some examples, the hardware processing circuitry may be further configured to refrain from transmission of the uplink frame when the candidate sub-channel is excluded from the random access portion.

In some examples, the hardware processing circuitry may be further configured to, when the candidate sub-channel is excluded from the random access portion, receive a second, subsequent random access TF that indicates a second random access portion of the sub-channels for a second uplink transmission period. The hardware processing circuitry may be further configured to, when the candidate sub-channel is excluded from the random access portion, randomly select a second candidate sub-channel from the channel resources and transmit the uplink frame on the second candidate sub-channel during the second uplink transmission period when the second candidate sub-channel is included in the second random access portion.

In some examples, the determination of the candidate sub-channel and the transmission of the uplink frame may be performed when the HEW station operates in an unassociated state of connectivity to the HEW AP. In some examples, the hardware processing circuitry may be further configured to, when the HEW station operates in an associated state of connectivity to the HEW AP, determine one or sub-channels that are allocated for transmission by the HEW station during the uplink transmission period. The determination may be based at least partly on the random access TF. The hardware processing circuitry may be further configured to, when the HEW station operates in the associated state of connectivity to the HEW AP, transmit a resource request (RR) frame on the allocated sub-channels during the uplink transmission period.

In some examples, the hardware processing circuitry may be further configured to refrain from reception of signals during a sleep period between the reception of the beacon frame and the reception of the random access TF. The sleep period may be based at least partly on the TF timing indicated in the beacon frame. In some examples, the hardware processing circuitry may be further configured to receive a second, subsequent random access TF. Each of the random access TFs may include a TF counter that indicates an index of the random access TF with respect to the number of TFs included in the beacon interval.

In some examples, the beacon frame may further include a beacon interval type that indicates whether random access is supported by the HEW AP during the beacon interval. The reception of the random access TF, the determination of the candidate sub-channel, and the transmission of the uplink frame may be performed when the beacon interval type indicates support for random access.

In some examples, the support for random access may be indicated by values of unassociated random access phase (U-RAP) or low power random access phase (PS-RAP) for the beacon interval type. When the beacon interval type takes the PS-RAP value, the beacon interval may be intended for low power HEW stations and the hardware processing circuitry may be further configured to transmit a diversity version of the uplink frame during a second, subsequent uplink transmission period.

In some examples, when the beacon interval type indicates support for both random access and scheduled access, the hardware processing circuitry may be further configured to receive one or more additional TFs, and the random access TF may be intended for HEW stations operating in the unassociated state of connectivity to the HEW AP. Furthermore, when the beacon interval type indicates support for both random access and scheduled access, at least one of the additional TFs may exclude allocations of sub-channels for random access and may include allocations of sub-channels for dedicated transmissions by HEW stations operating in an associated state of connectivity to the HEW AP, and the TF timing included in the beacon frame may indicate timing for the random access TF and the additional TFs.

In some examples, the random access TF may further indicate a scheduled access portion of the sub-channels that are allocated to a second HEW station for the uplink transmission period. In some examples, the sub-channels may comprise a predetermined bandwidth and may further comprise multiple sub-carriers. In some examples, the HEW station may further comprise one or more antennas configured to receive the beacon frame and the random access TF and to transmit the uplink frame.

An example method for uplink random access contention performed by a high-efficiency Wi-Fi (HEW) station is also disclosed herein. The method may comprise receiving a beacon frame that indicates a schedule for trigger frames (TFs) transmitted by an HEW access point (AP) during a beacon interval and further indicates either random access or scheduled access for the TFs. The method may further comprise, when the HEW station operates in an unassociated state of connectivity to the HEW AP, refraining from reception of signals during a sleep period between the beacon frame and a random access TF. The method may further comprise, when the HEW station operates in the unassociated state, transmitting an uplink frame on a randomly selected sub-channel when the randomly selected sub-channel is included in a random access portion of channel resources indicated in the random access TF.

In some examples, the method may further comprise, when the HEW station operates in an associated state of connectivity to the HEW AP, refraining from reception of signals during a sleep period between the beacon frame and a scheduled access TF. The method may further comprise, when the HEW station operates in the associated state, transmitting a resource request (RR) frame in a portion of the channel resources dedicated to the HEW station and indicated in the scheduled access TF.

In some examples, the beacon frame may further indicate a TF timing for the random access TF and the scheduled access TF, and the sleep periods may be based on the TF timing. In some examples, at least one of the scheduled TFs may be for an unassociated random access phase (U-RAP) portion of the beacon interval, the U-RAP portion reserved for HEW stations operating in an unassociated state of connectivity to the HEW AP. At least one of the scheduled TFs may be for a low-power random access phase (PS-RAP) portion of the beacon interval, the PS-RAP portion reserved for low power HEW stations operating in the unassociated state. At least one of the scheduled TFs may be for a scheduled access phase (SAP) portion of the beacon interval, the SAP portion reserved for HEW stations operating in an associated state of connectivity to the HEW AP.

In some examples, the channel resources may comprise multiple sub-channels. The sub-channels may comprise a predetermined bandwidth and may further comprise multiple sub-carriers.

An example of a non-transitory computer-readable storage medium that stores instructions for execution by one or more processors of a high-efficiency WiFi (HEW) station to perform operations for communication is also disclosed herein. The operations may configure the one or more processors to receive a beacon frame that indicates a number of trigger frames (TFs) included in a beacon interval and further indicates a TF timing for the beacon frame. The beacon frame may be received from an HEW access point (AP) in channel resources that include multiple sub-channels. The operations may further configure the one or more processors to receive a random access TF that indicates a random access portion of the sub-channels that are allocated for random access contention during an uplink transmission period. The random access TF may be received from the HEW AP according to the indicated TF timing. The operations may further configure the one or more processors to determine a candidate sub-channel from the channel resources and, when the candidate sub-channel is included in the random access portion, transmit an uplink frame on the candidate sub-channel during the uplink transmission period. In some examples, the operations may further configure the one or more processors to refrain from transmission of the uplink frame when the candidate sub-channel is excluded from the random access portion.

An example of a high-efficiency Wi-Fi (HEW) access point (AP) is also disclosed herein. The HEW AP may comprise hardware processing circuitry configured to transmit a beacon frame that indicates a schedule of events for a beacon interval, wherein the events include transmission of TFs by the HEW AP and reception of uplink frames from one or more HEW stations. The hardware processing circuitry may be further configured to transmit a first random access TF that indicates a first random access portion of channel resources allocated for random access by the HEW stations during a first random access period. The hardware processing circuitry may be further configured to receive one or more access request (AR) frames from the HEW stations in the first random access portion during the first random access period. The hardware processing circuitry may be further configured to transmit a second random access TF that indicates a second random access portion of the channel resources for a second random access period. The second random access portion may be based at least partly on the received AR frames.

In some examples, the hardware processing circuitry may be further configured to transmit a first scheduled access TF that indicates a dedicated access portion of the channel resources allocated to a first HEW station during a first scheduled access period. The hardware processing circuitry may be further configured to receive one or more resource request (RR) frames from the first HEW station in the dedicated access portion during the first scheduled access period. In some examples, the HEW AP may further comprise one or more antennas configured to transmit the beacon frames and the TFs and to receive the AR frames and the RR frames.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A high-efficiency (HE) station comprising: memory; and, hardware processing circuitry coupled to the memory, the hardware processing circuitry configured to:
   receive a beacon frame that indicates a trigger frame (TF) timing for a beacon interval, wherein the beacon frame is received from an HE access point (AP) in channel resources that include multiple sub-channels;
   receive a random access TF that indicates a random access portion of the sub-channels that are allocated for random access contention during an uplink transmission period;
   determine a candidate sub-channel from the channel resources;
   when the candidate sub-channel is included in the random access portion, transmit an uplink frame on the candidate sub-channel during the uplink transmission period;
   refrain from transmission of the uplink frame when the candidate sub-channel is excluded from the random access portion; and
   when the candidate sub-channel is excluded from the random access portion:
      receive a second, subsequent random access TF that indicates a second random access portion of the sub-channels for a second uplink transmission period,
      select a second candidate sub-channel from the channel resources, and
      transmit the uplink frame on the second candidate sub-channel during the second uplink transmission period when the second candidate sub-channel is included in the second random access portion.

2. The HE station according to claim 1, wherein the beacon frame further indicates a number of TFs included in the beacon interval, and wherein the random access TF is received from the HEW AP according to the indicated TF timing.

3. The HE station according to claim 1, wherein the random access portion is indicated by a random access Association Identifier (AID).

4. The HE station according to claim 1, wherein the uplink frame includes an association request (AR) frame or a probe request (PR) frame.

5. The HE station according to claim 1, wherein the candidate sub-channel is selected randomly from the channel resources.

6. The HE station according to claim 1, wherein the determination of the candidate sub-channel and the transmission of the uplink frame are performed when the HEW station operates in an unassociated state of connectivity to the HEW AP.

7. The HE station according to claim 6, the hardware processing circuitry further configured to:
   when the HEW station operates in an associated state of connectivity to the HEW AP:
      determine, based at least partly on the random access TF, one or sub-channels that are allocated for transmission by the HEW station during the uplink transmission period; and
   transmit a resource request (RR) frame on the allocated sub-channels during the uplink transmission period.

8. The HE station according to claim 1, wherein:
the hardware processing circuitry is further configured to refrain from reception of signals during a sleep period between the reception of the beacon frame and the reception of the random access TF, and the sleep period is based at least partly on the TF timing indicated in the beacon frame.

9. The HE station according to claim 1, wherein:
the hardware processing circuitry is further configured to receive a second, subsequent random access TF, and each of the random access TFs includes a TF counter that indicates an index of the random access TF with respect to the number of TFs included in the beacon interval.

10. The HE station according to claim 1, wherein:
the beacon frame further includes a beacon interval type that indicates whether random access is supported by the HEW AP during the beacon interval, the reception of the random access TF, the determination of the candidate sub-channel, and the transmission of the uplink frame are performed when the beacon interval type indicates support for random access.

11. The HE station according to claim 10, wherein:
the support for random access is indicated by values of unassociated random access phase (U-RAP) or low power random access phase (PS-RAP) for the beacon interval type, and when the beacon interval type takes the PS-RAP value:
   the beacon interval is intended for low power HEW stations, and the hardware processing circuitry is further configured to transmit a diversity version of the uplink frame during a second, subsequent uplink transmission period.

12. The HE station according to claim 10, wherein:
when the beacon interval type indicates support for both random access and scheduled access:
   the hardware processing circuitry is further configured to receive one or more additional TFs, the random access TF is intended for HEW stations operating in the unassociated state of connectivity to the HEW AP, at least one of the additional TFs excludes allocations of sub-channels for random access and includes allocations of sub-channels for dedicated transmissions by HEW stations operating in an associated state of connectivity to the HEW AP, and the TF timing included in the beacon frame indicates timing for the random access TF and the additional TFs.

13. The HE station according to claim 1, wherein the random access TF further indicates a scheduled access portion of the sub-channels that are allocated to a second HEW station for the uplink transmission period.

14. The HE station according to claim 1, wherein the sub-channels comprise a predetermined bandwidth and further comprise multiple sub-carriers.

15. The HE station according to claim 1, the HEW station further comprising one or more antennas configured to receive the beacon frame and the random access TF and to transmit the uplink frame.

16. A method for uplink random access contention performed by a high-efficiency (HE) station, the method comprising:
   receiving a beacon frame that indicates a schedule for trigger frames (TFs) transmitted by an HE access point (AP) during a beacon interval and further indicates either random access or scheduled access for the TFs;
   when the HEW station operates in an unassociated state of connect to the HEW AP:
      refraining from reception of signals during a sleep period between the beacon frame and a random access TF; and
   transmitting an uplink frame on a randomly selected sub-channel when the randomly selected sub-channel is included in a random access portion of channel resources indicated in the random access TF, wherein at least one of the scheduled TFs is for an unassociated random access phase (U-RAP) portion of the beacon interval, the U-RAP portion reserved for HE stations operating in an unassociated state of connectivity to the HE AP, at least one of the scheduled TFs is for a low-power random access phase (PS-RAP) portion of the beacon interval, the PS-RAP portion reserved for low power HE stations operating in the unassociated state, and at least one of the scheduled TFs is for a scheduled access phase (SAP) portion of the beacon interval, the SAP portion reserved for HE stations operating in an associated state of connectivity to the HE AP.

17. The method according to claim 16, the method further comprising:
   when the HE station operates in an associated state of connectivity to the HEW AP:
      refraining from reception of signals during a sleep period between the beacon frame and a scheduled access TF; and
   transmitting a resource request (RR) frame in a portion of the channel resources dedicated to the HE station and indicated in the scheduled access TF.

18. The method according to claim 17, wherein the beacon frame further indicates a TF timing for the random access TF and the scheduled access TF, and the sleep periods are based on the TF timing.

19. The method according to claim 16, wherein:
   the channel resources comprise multiple sub-channels, and the sub-channels comprise a predetermined bandwidth and further comprise multiple sub-carriers.

* * * * *